(12) United States Patent
Fujimoto

(10) Patent No.: US 10,976,930 B2
(45) Date of Patent: Apr. 13, 2021

(54) MEMORY DEVICE AND HOST DEVICE

(71) Applicant: TOSHIBA MEMORY CORPORATION, Minato-ku (JP)

(72) Inventor: Akihisa Fujimoto, Yamato (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 16/429,388

(22) Filed: Jun. 3, 2019

(65) Prior Publication Data
US 2019/0286334 A1 Sep. 19, 2019

Related U.S. Application Data

(60) Continuation of application No. 15/955,867, filed on Apr. 18, 2018, now Pat. No. 10,353,586, which is a
(Continued)

(30) Foreign Application Priority Data

Oct. 30, 2012 (JP) .................... 2012-238849
Aug. 9, 2013 (JP) .................... 2013-166804

(51) Int. Cl.
*G06F 3/06* (2006.01)
*G06F 12/02* (2006.01)
*G06F 13/42* (2006.01)

(52) U.S. Cl.
CPC .......... *G06F 3/0608* (2013.01); *G06F 3/0658* (2013.01); *G06F 3/0679* (2013.01);
(Continued)

(58) Field of Classification Search
CPC .. G06F 3/0679; G06F 12/0246; G06F 3/0608; G06F 2212/1016;
(Continued)

(56) References Cited

U.S. PATENT DOCUMENTS 7,613,874 B2  11/2009  Park
8,775,724 B2   7/2014  Matsukawa et al.
(Continued)

FOREIGN PATENT DOCUMENTS

CN  101019098 A  8/2007
CN  102193872 A  9/2011
(Continued)

OTHER PUBLICATIONS

Combined Chinese Office Action and Search Report dated Jan. 4, 2017 in Patent Application No. 201380056820.6 (with English language translation and English Translation of Categories of Cited Documents).
(Continued)

*Primary Examiner* — Hua J Song
(74) *Attorney, Agent, or Firm* — Oblon, McClelland, Maier & Neustadt, L.L.P.

(57) ABSTRACT

According to one embodiment, a memory device includes a nonvolatile semiconductor memory having physical storage areas that includes a user area externally accessible and are divided into management units and a control unit. The control unit receives a control command having a first argument to designate a sequential write area and a read command or a write command, assigns a management unit represented by an address of the read command or the write command as the sequential write area, and changes memory access control by judging whether an address of a memory access command to access the user area indicates access in the sequential write area whose size is equivalent to the management unit.

9 Claims, 13 Drawing Sheets

Related U.S. Application Data division of application No. 14/700,625, filed on Apr. 30, 2015, now Pat. No. 9,983,794, which is a continuation of application No. PCT/JP2013/074959, filed on Sep. 10, 2013.

(52) U.S. Cl.
CPC ...... *G06F 12/0246* (2013.01); *G06F 13/4234* (2013.01); *G06F 2212/1016* (2013.01); *G06F 2212/1044* (2013.01); *G06F 2212/177* (2013.01); *G06F 2212/7202* (2013.01)

(58) Field of Classification Search
CPC ..... G06F 2212/1044; G06F 2212/7202; G06F 3/0658; G06F 2212/177; G06F 13/4234
USPC ........................................................ 711/102
See application file for complete search history.

(56) References Cited

U.S. PATENT DOCUMENTS

| | | |
|---|---|---|
| 2007/0043924 A1 | 2/2007 | Ito et al. |
| 2007/0094468 A1 | 4/2007 | Haustein et al. |
| 2007/0226404 A1 | 9/2007 | Ito et al. |
| 2008/0209092 A1* | 8/2008 | Yun ................ G06F 13/385 710/106 |
| 2011/0231610 A1 | 9/2011 | Yano et al. |
| 2011/0238933 A1 | 9/2011 | Fujimoto |
| 2012/0254524 A1* | 10/2012 | Fujimoto ............. G06F 3/0679 711/103 |
| 2013/0080688 A1* | 3/2013 | Park .................. G06F 3/0688 711/103 |
| 2013/0297900 A1 | 11/2013 | Fukutomi et al. |
| 2013/0318281 A1 | 11/2013 | Fujimoto et al. |
| 2014/0310460 A1 | 10/2014 | Fujimoto |

FOREIGN PATENT DOCUMENTS

| | | |
|---|---|---|
| CN | 102246151 A | 11/2011 |
| CN | 102687125 A | 9/2012 |
| JP | 2006-40264 A | 2/2006 |
| JP | 2006-178923 A | 7/2006 |
| JP | 2006-209744 A | 8/2006 |
| JP | 2011-175615 A | 9/2011 |
| JP | 2012-178132 A | 9/2012 |
| JP | 2014-010708 A | 1/2014 |
| TW | 201201017 A1 | 1/2012 |
| TW | 201205286 A1 | 2/2012 |

OTHER PUBLICATIONS

Office Action dated Apr. 5, 2016 in Japanese Patent Application No. 2013-166804.
Combined Taiwanese Office Action and Search Report dated Mar. 30, 2015 in Patent Application No. 102132804 (with English language translation).
International Search Report dated Feb. 25, 2014 for PCT/JP2013/074959 filed on Sep. 10, 2013 in English Language.
Written Opinion dated Feb. 25, 2014 for PCT/JP2013/074959 filed on Sep. 10, 2013 in English Language.
Korean Office Action dated Feb. 16, 2016 in Patent Application No. 10-2015-7010904 (with English translation).

* cited by examiner

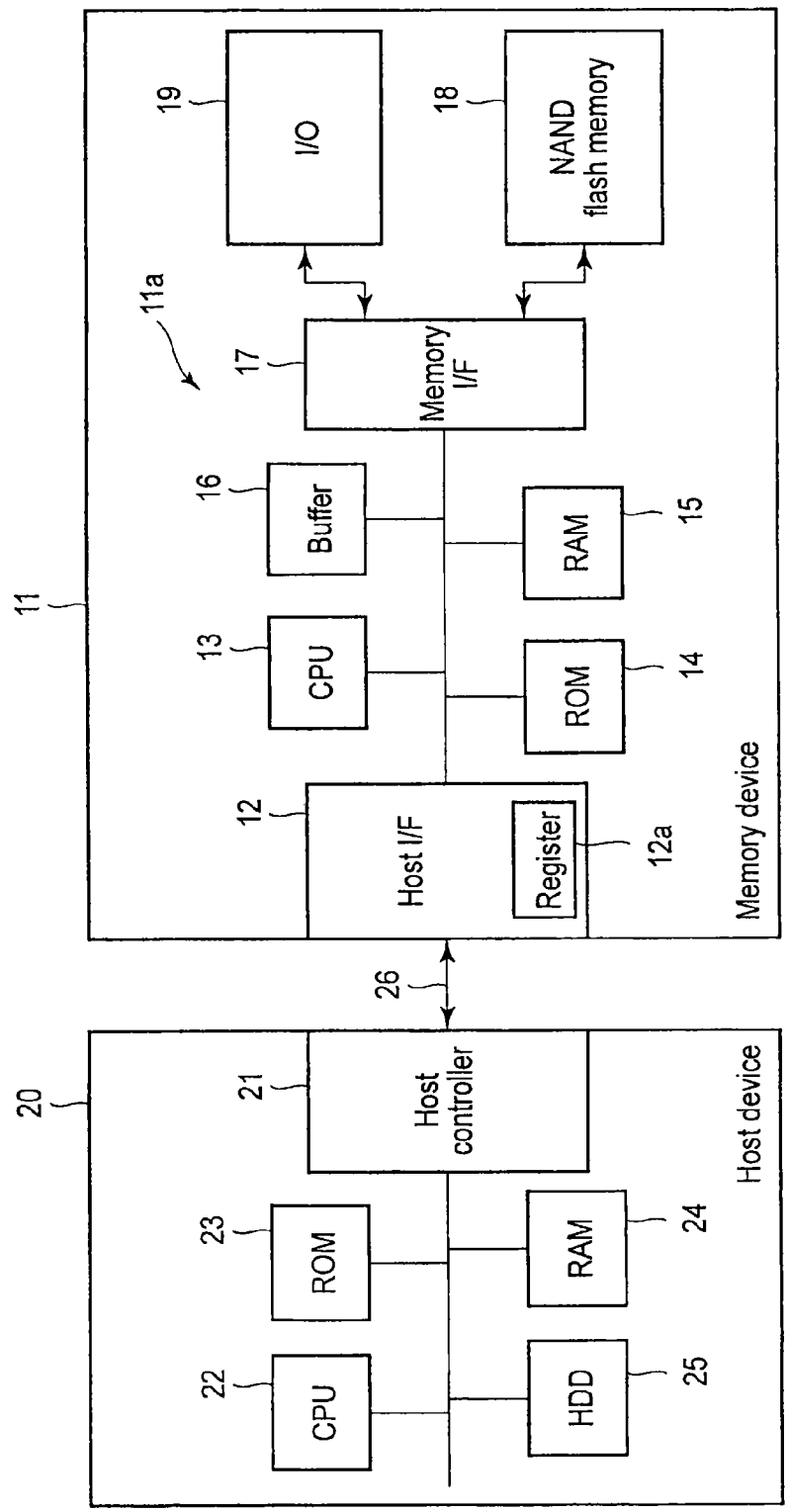
F I G. 1

| S | T | Index | SCC | OWAS | Reserved | CRC7 | E |
|---|---|---|---|---|---|---|---|
| 0 | 1 | 010100 | xxxx | xxxx | all 0 | xx | 1 |

Over-Write Area Size
0000b: Read / Write Length   1000b: 8MB
0001b: 64KB                  1001b: 16MB
0010b: 128KB                 1010b: 32MB
0011b: 256KB                 1011b: 64MB
0100b: 512KB                 1100b: 128MB
0101b: 1MB                   1101b: 256MB
0110b: 2MB                   1110b: 512MB
0111b: 4MB                   1111b: 1GB

| Speed class control | $t_{BUSY}$(max.) |
|---|---|
| 0000b: Start recording | 1 second |
| 0001b: Update DIR | 10ms |
| 0010b: Reserved | |
| 0011b: Reserved | |
| 0100b: Update CI | 10ms |
| 0101b-0111b: Reserved | |
| 1000b: Set Sequential-Write AU | 1 second(for set up), 10ms(during operation) |
| 1001b: Set Over-Write Area | 100ms |
| 1010b: Set Top of Data Area | 100ms |
| 1011b: Arrange Area | 1 second(for set up), 250ms(during operation) |
| 1100b-1111b: Reserved | |

Speed class { 0000b–0100b }
Video grade { 1000b–1011b }

FIG. 4

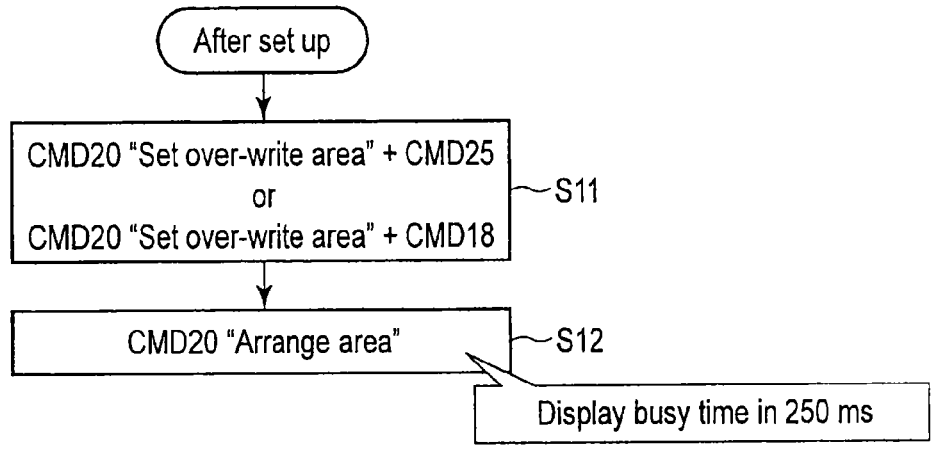
FIG. 8
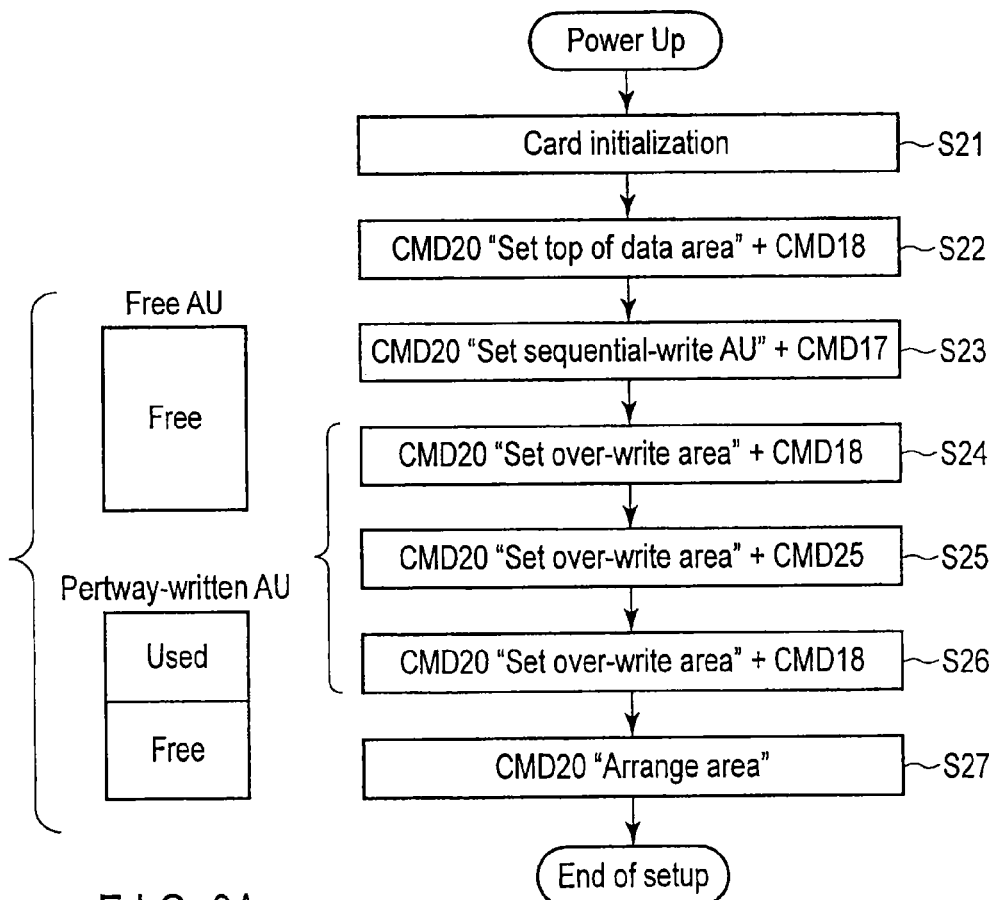
FIG. 9A
FIG. 9B

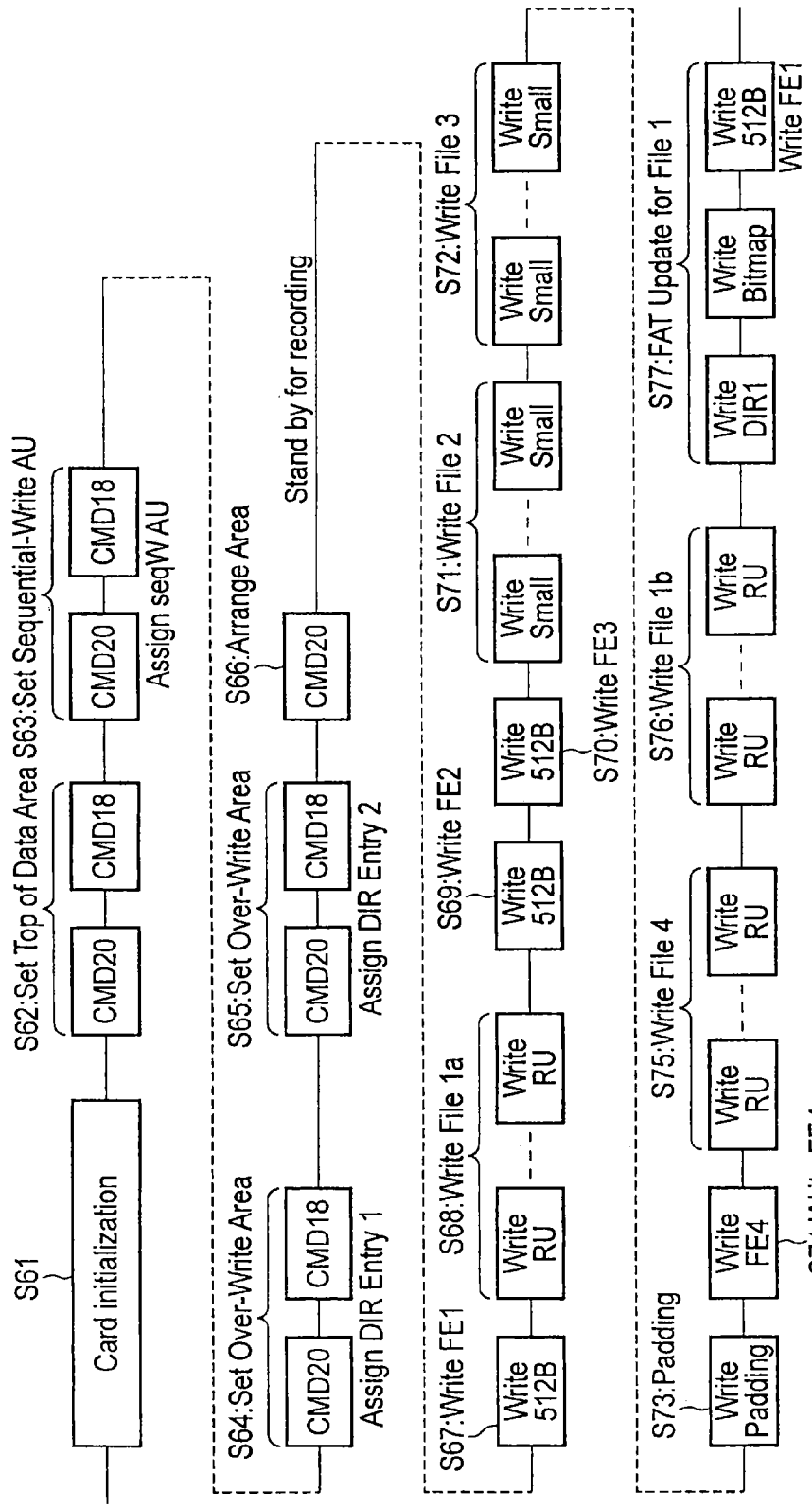
F I G. 14

MEMORY DEVICE AND HOST DEVICE

CROSS-REFERENCE TO RELATED APPLICATIONS

This application is a Continuation of U.S. application Ser. No. 15/955,867, filed Apr. 18, 2018, which is a Divisional of U.S. application Ser. No. 14/700,625 (now U.S. Pat. No. 9,983,794), filed Apr. 30, 2015, which is a Continuation Application of PCT Application No. PCT/JP2013/074959, filed Sep. 10, 2013 and based upon and claims the benefit of priority from Japanese Patent Application No. 2012-238849, filed Oct. 30, 2012; and No. 2013-166804, Aug. 9, 2013, the entire contents of each of which are incorporated herein by reference.

FIELD

Embodiments described herein relate generally to a memory device and a host device.

BACKGROUND

Memory devices such as an SD™ card are classified into a plurality of classes to facilitate matching between the performance of a memory device and that required by a host device. A speed class provides a method of classifying the performance of memory devices by speed class numbers and calculating the performance of the memory devices.

The speed class controls the write procedure using specific commands. To do memory write while maintaining performance, sequential write is performed in an allocation unit (to be referred to as an AU or sequential write area hereinafter) that is the physical memory area of a memory device. Data needs to be written from the start of an allocation unit. For this reason, an allocation unit in which data has been written partway cannot be used for data recording. Therefore, it is desired to provide memory device and host device capable of using an allocation unit in which data has been written partway and improving the utilization efficiency of allocation units.

BRIEF DESCRIPTION OF DRAWINGS

FIG. 1 is a block diagram showing an example of a memory system to which the embodiment is applied.

FIG. 4 is a view showing an example of a command format applied to this embodiment.

FIG. 8 is a flowchart showing an example of control to prepare a card area using a command.

FIG. 9A is a view showing an example of write in an allocation unit, and FIG. 9B is a flowchart showing an example of a setup sequence.

FIG. 14 is a view showing an example in which the operation shown in FIG. 3 is expressed as a command sequence.

DETAILED DESCRIPTION

Figure 2:
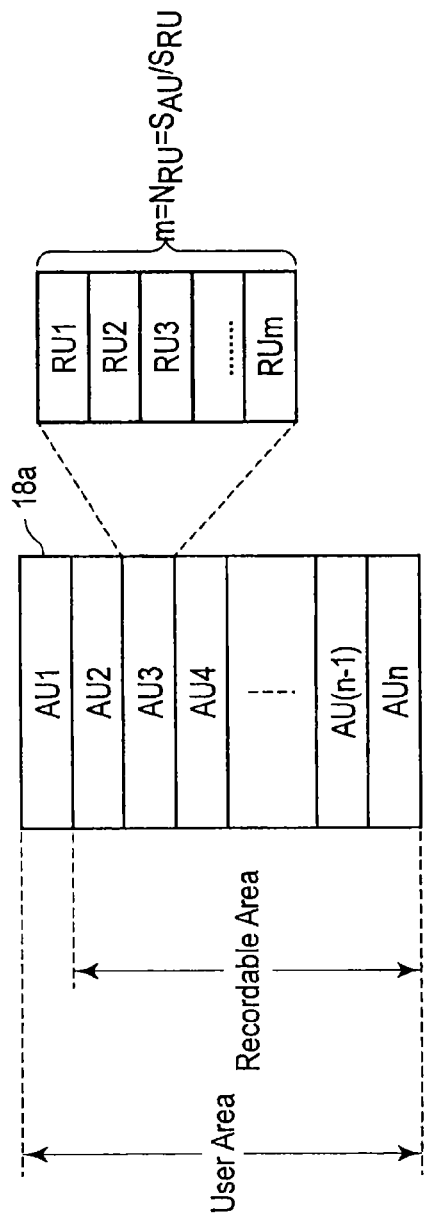
FIG. 2 is a view showing the user area management unit of a NAND flash memory.

In general, according to one embodiment, a memory device includes a nonvolatile semiconductor memory and a control unit. The nonvolatile semiconductor memory has a plurality of physical storage areas that includes a user area externally accessible and is divided into plurality of management units. The control unit is configured to control the nonvolatile semiconductor memory. The control unit receives a control command having a first argument to designate a sequential write area and a read command or a write command, assigns a management unit represented by an address of the read command or the write command as the sequential write area, and changes memory access control by judging whether an address of a memory access command to access the user area indicates access in the sequential write area whose size is equivalent to the management unit.

The embodiment will now be described with reference to the accompanying drawings.

FIG. 1 schematically showing a memory system according to the embodiment.

The memory system includes a memory device 11 (to be also referred to as a card hereinafter) such as an SD card, and a host device 20.

The host device 20 and the memory device 11 are connected by SD Bus Interface 26 to communicate using commands. The memory device 11 can indicate busy to host through SD Bus Interface. Busy indication means that card is executing something and prevents host from issuing a next command.

When connected to the host device 20, the memory device 11 receives power and operates to perform processing corresponding to access from the host device 20. The memory device 11 includes a controller 11a.

The controller 11a includes, for example, a host interface (I/F) 12, a CPU 13, a read only memory (ROM) 14, a random access memory (RAM) 15 serving as a volatile memory, a buffer 16, and a memory interface (I/F) 17. These are connected by a bus. The memory interface 17 is connected to, for example, a NAND flash memory 18 and an I/O 19 serving as an extension function unit. For example, a wireless LAN device or the like can be applied to the extension function unit.

The host interface 12 performs interface processing between the controller 11a and the host device 20. The host interface 12 includes a register 12a. The register 12a stores data unique to the memory device 11 such as the size of an AU to be described later. The register 12a also stores status during execution. Default setting is read out from the NAND flash memory 18 and set in the register 12a at the time of power-on. The contents of the register 12a are read out by a command, for example, the status can be read by CMD13 issued by the host device 20.

The memory interface 17 performs interface processing between the controller 11a and the NAND flash memory 18 or I/O 19. Data of the host interface 12, the RAM 15, the buffer 16, and the like can be transferred not only by data transfer of the CPU 13 but also by DMA transfer of hardware.

The CPU 13 controls the operation of the entire memory device 11. The CPU 13 loads firmware (control program or the like) stored in the ROM 14 or firmware recorded in the NAND flash memory 18 onto the RAM 15 and executes predetermined processing. That is, the CPU 13 creates various kinds of tables and, for example, an extended register on the RAM 15 and, upon receiving a write command, a read command, or an erase command from the host device 20, accesses an area on the NAND flash memory 18 or controls data transfer processing via the buffer 16.

The ROM 14 stores firmware such as a control program to be used by the CPU 13. Some pieces of firmware may be implemented in the ROM 14, whereas the remaining pieces of firmware may be stored in the NAND flash memory 18, extracted to the RAM 15, and executed. The RAM 15 is used as the work area of the CPU 13, and stores control programs, various kinds of tables, and extended registers.

The buffer 16 temporarily stores a predetermined amount of data (for example, data of one page) when data sent from the host device 20 is to be written in the NAND flash memory 18, or temporarily stores a predetermined amount of data when data read out from the NAND flash memory 18 is to be sent to the host device 20. Intervening the buffer 16 enables asynchronous control of an SD bus interface and a back end.

The NAND flash memory 18 includes memory cells having, for example, a stacked gate structure or memory cells having a MONOS structure.

The I/O 19 has the function of a peripheral device or an interface for a digital camera, a PHS, or the like. For example, when a wireless LAN device is applied as the I/O 19, even a digital camera having no wireless communication function can perform wireless data communication with an external server or an external PC (Personal Computer).

As the host device 20, for example, a digital camera, a PHS, or the like is applicable. The host device 20 includes a host controller 21, a CPU 22, a ROM 23, a RAM 24, and, for example, a hard disk 25 (including an SSD). These are connected by a bus.

The CPU 22 controls the entire host device 20. The ROM 23 stores firmware necessary for the operation of the CPU 22. Firmware read out from a storage device (e.g., HDD 25) may be stored in the RAM 24 to constitute a system without the ROM 23. The RAM 24 is used as, for example, the work area of the CPU 22. Programs executable by the CPU 22 are also loaded and executed here. The hard disk (HDD) 25 holds various kinds of data. The host controller 21 performs interface processing for the memory device 11 in a state in which the memory device 11 is connected. The host controller 21 also issues various kinds of commands to be described later in accordance with an instruction from the CPU 22.

Moreover, the host device 20 has the memory management software which is configured to recognize a file system that formats a user area of NAND flash memory 18, stored in the hard disk 25, for example. The memory management software determines whether to write data in a sequential write area or an overwrite area, based on the extension of the file name or a data length of a file which will be created.

FIG. 2 shows the management unit of a user area 18a usable by the user out of the areas of the NAND flash memory 18. The user area 18a of the NAND flash memory 18, which is an area externally accessible using a command, is divided into a plurality of AUs. The size of each of AU1 to AUn is determined based on the physical boundaries of the NAND flash memory 18 (the boundaries are not equivalent to those managed by the file system in the user area). Multiplying the AU size by n (integer) yields the whole memory capacity of the user area 18a.

The information of the file system such as a file allocation table (FAT) is normally recorded in AU1 at the start. For this reason, write performance for AU1 is not guaranteed. (If AU2 is free AU,) AU2 to AUn are recording areas of guaranteed performance, and are indicated as recordable areas. However, AUs to record directory entry or overwrite are excluded from performance guarantee. If the AU size is small, and the information of the file system is recorded in, for example, AU1 to AUp, AU(p+1) to AUn are recording areas of guaranteed performance.

In addition, each AU is divided into a plurality of recording units (to be referred to as RUs hereinafter). Performance is guaranteed for sequential write of continuously writing data whose address is on RU boundary and data length is at least equal to or more than the RU size. For this reason, the host device 20 needs to execute multi-block write in a unit corresponding to an integer multiple of the RU. This is because certain data length is needed to make the effect of the pipeline operation in the card appear in the performance.

FIG. 2 indicates that one AU is formed from m RUs. Letting $S_{RU}$ be the size of the RU, and $S_{AU}$ be the size of the AU, the number m of RUs in one AU=$N_{RU}$ is given by $S_{AU}/S_{RU}$.

The worst value of average performance when sequential write is performed for an arbitrary AU is represented by a write performance information Pw of the memory device. When the AU size exceeds 4 MB, Pw is defined as the worst value of average performance of 4-MB areas obtained by dividing the AU into 4-MB areas.

The host device 20 can read out Pw and the AU size $S_{AU}$ from, for example, the register 12a of the memory device and use them for performance calculation. RU size is defined as a fixed value.

(Performance Estimation in Writing Plurality of Files)

The minimum average performance of sequential write for an area represented by an AU address and an AU size can be estimated from Pw. Since the values of Pw and AU size change between devices, the host device 20 needs to cope with this by reading out the Pw and AU size from the register 12a of the memory device.

An example of the performance estimation method for a memory device having performance Pw=10 MB/sec will be described here. When the memory access time of a device is managed using time slots, this device can be considered to be able to write data of at least 10 MB in each time slot of 1 sec. When performing recording at average performance of 4 MB/sec, 4-MB data needs to be written somewhere in the 1-sec time slot.

When time-divisionally writing three files, the write performance of each file can be adjusted by adjusting the data write amount in the 1-sec time slot. When writing each of the three files at 3 MB/sec, they are divisionally written as 3-MB data each in the 1-sec time slot. The remaining 100 ms of the time slot can be assigned to part of time to update the FAT as a margin necessary for control on the host device side. That is, the host device can calculate and control the write performance of a plurality of files by determining the number of time slots to be assigned and time-divisionally performing write.

(Example of Multi-File Recording)

Figure 3:
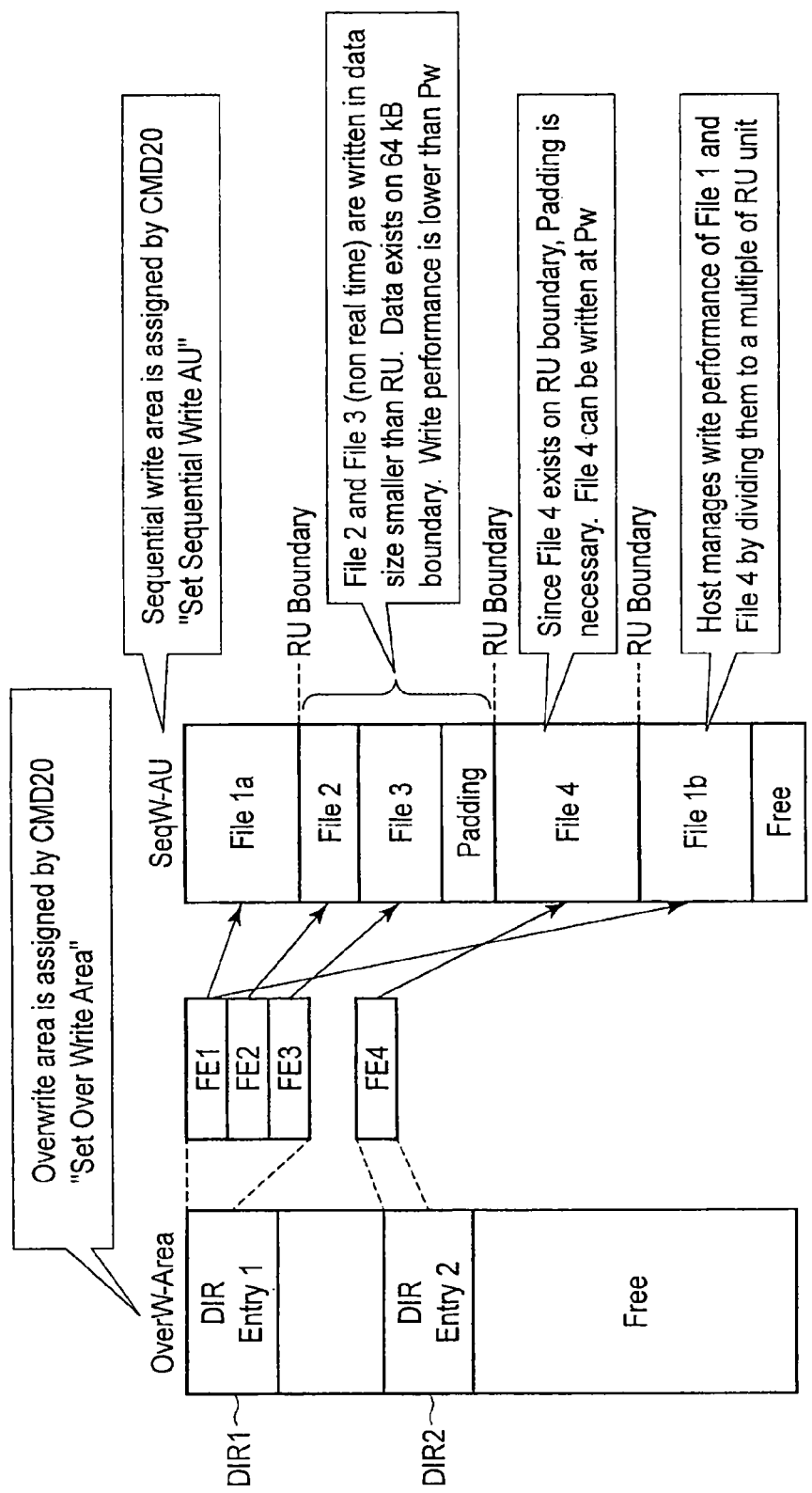
FIG. 3 is a view showing an example of multi-file recording.

FIG. 3 shows an example of multi-file recording for the user area 18a of the NAND flash memory 18.

Referring to FIG. 3, the overwrite area (OverW-Area) is assigned by a command (CMD20) "Set Over-Write Area" to be described later. An area (to be referred to as a sequential write area hereinafter) to perform sequential write is assigned by a CMD20 "Set Sequential-Write AU".

One sequential write area can be assigned by the CMD20 "Set Sequential-Write AU". The host device 20 can divisionally write a plurality of files in the sequential write area.

Referring to FIG. 3, three file entries FE1, FE2, and FE3 are created in a directory entry DIR1 of the overwrite area (OverW-Area), and a file entry FE4 is created in a directory entry DIR2.

In the sequential write area SeqW-AU, File 1a is part of File 1 and is written on the RU basis while being made to match the RU boundary. For this reason, at least the performance Pw is guaranteed when writing File 1a.

Each of File 2 and File 3 has a size equal to or smaller than the RU and is written in a data size smaller than the RU. The data exist on, for example, 64-KB boundaries smaller than the RU boundary. When writing File 2 and File 3, since the data lengths are smaller than the RU size, the performance Pw is not guaranteed.

If File 4 needs to be written while guaranteeing at least the performance Pw, first, dummy data is written up to the RU boundary as Padding following File 3. Padding may be done by host or done by card. Next, File 4 is written while being made to match the RU boundary. That is, since the data of File 4 is written on the RU basis while being made to match the RU boundary, the performance Pw is guaranteed.

File 1b that is the rest of File 1 is written next to File 4. When File 1b is written on the RU basis while being made to match the RU boundary, at least the performance Pw is guaranteed. That is, the host device 20 manages the write performance of File 1 and File 4 by dividing them to a multiple of RU unit.

Although not illustrated, FAT update is executed to close File 1. A FAT area and bitmap (not shown) are updated, and 512 bytes including the file entry 1 (FE1) in the DIR area are updated, thereby determining the write data partway through File 1 as the file system. The host can thus read out data up to the written data of File 1 from the file system information.

FIG. 4 shows an example of the format of the command CMD20 applied to this embodiment.

In the CMD20 shown in FIG. 4, "S" is the start bit of the command, "T" is a bit representing the transfer direction, "index" indicates the command number, which has a bit string to specify that the command is a control command such as sequential write.

"SCC" is an argument representing speed class control, which is an operation designation portion for designating the function or operation of the command. "SCC" is formed from a plurality of bits, and the bits of "SCC" set various functions of the CMD20.

"OWAS" (Over Write Area Size) is an argument to designate the size of the overwrite area.

"CRC7" indicates a cyclic redundancy check code.

"E" is the end bit of the command.

As described above, in the CMD20, the bits of "SCC" set, for example, "Start Recording", "Update DIR", "Update CI", "Set Sequential-Write AU", "Set Over-Write Area", "Set Top of Data Area", and "Arrange Area".

(Set Sequential-Write AU)

The CMD20 "Set Sequential-Write AU" is a command to assign the sequential write area. This CMD20 "Set Sequential-Write AU" is used in combination with the read command or write command, as will be described later.

When the CMD20 "Set Sequential-Write AU" is used in, for example, a setup sequence to prepare for recording, a busy time of, for example, 1 sec is allowed as the processing time of the command. When this command is used during data recording, the allowed busy time is suppressed to, for example, 10 ms.

(Set Over-Write Area)

The CMD20 "Set Over-Write Area" is a command to set the overwrite area. The overwrite area is designated using the CMD20 "Set Over-Write Area" in combination with the read command or write command, and an address. A busy period of, for example, 100 ms is set in the CMD20 "Set Over-Write Area". The overwrite area cannot be assigned in the sequential write area.

Note that in processing using the CMD20 and the write command/read command, memory access control can be, for example, control of the busy time representing that the write command is being processed, control to maintain data in unwritten areas, or cache control (a method of writing data in the buffer and arranging the data written the buffer and writing it in the flash memory later, instead of directly writing the data in the NAND flash memory). In case of using cache, as write busy time varies a lot for each access, write performance is estimated by an average of busy time.

(Set Top of Data Area)

A CMD20 "Set Top of Data Area" is a command to notify the card of the data area of the file system in combination with the read command. The card need not analyze the file system, and can predict the position of the DIR area and bitmap. The start address of the data area is designated by the CMD20 "Set Top of Data Area" and the read command. A busy period of, for example, 100 ms is set in the CMD20 "Set Top of Data Area".

(Arrange Area)

A CMD20 "Arrange Area" is a command to permit the memory device 11 to prepare an area within a specific time, and represents completion of preparation by canceling busy of the CMD20. The CMD20 "Arrange Area" is solely used, unlike the other functions of the CMD20. When the CMD20 "Arrange Area" is used in the setup sequence, a busy time of, for example, 1 sec is allowed and when the CMD 20 "Arrange Area" is used in data recording, the allowed busy time is suppressed to, for example, 250 ms.

("OWAS": Over Write Area Size)

"OWAS" is an argument to designate the size of the overwrite area.

In this embodiment, there are two methods of designating the size of the overwrite area.

(1) When "OWAS" of CMD20 is set to "0000b"

In this case, the size of the overwrite area is designated by the read operation range of the CMD18 following the CMD20 or the write operation range of the CMD25.

For example, when creating a new directory entry area, data "0" needs to be written in the area for initialization. When the host device 20 issues the CMD20 "Set Over-Write Area"+CMD25 and writes data "0", the created directory entry area can be assigned as the overwrite area. In the FAT system, however, "0" need not always be written in all bits, and a file entry such as "." representing the current directory and " . . . " representing the parent directory can be written by this command.

(2) When "OWAS" of CMD20 is set to "0001b" to "1111b, overwrite areas having sizes shown in FIG. 4 can be assigned. In this case, the read size (CMD18) and the write size (CMD25) need to be equal to or smaller than the set value of "OWAS".

A memory device supporting the CMD20 of this embodiment can receive a conventional command and convert its interpretation into the command of this embodiment. This makes it possible to maintain the compatibility to some extent.

(Start Recording)

A CMD20 "Start Recording" is a command to designate the sequential write area first. This "Start Recording" can directly be handled as "Set Sequential-Write AU". This CMD20 can indicate a busy of 1 sec.

"Start Recording" is used only to designate the first AU but not to designate the following sequential write area. For this reason, an AU that satisfies the following conditions needs to be assigned as a sequential write area. When the multi-block write command CMD25 indicates data write to be performed up to the final area on the RU basis while being made to match the RU boundary, its write destination is a assigned sequential write area, and when the next CMD25 indicates data write to be performed from the start of another AU on the RU basis while being made to match the RU boundary, the newly written AU is assigned as the sequential write area.

(Update DIR)

"Update DIR" is issued before the CMD24/25 that updates a 512-byte area that is part of the directory entry.

If the 512-byte area from the address represented by the CMD24/25 is not assigned as the overwrite area, at least an area including the 512-byte area from the address represented by the CMD24/25 is assigned as the overwrite area.

If the 512-byte area from the address represented by the CMD24/25 is already assigned as the overwrite area, this assignment is maintained, and the CMD20 "Update DIR" need not perform any processing more.

(Update CI)

"Update CI" is used to write small CI (Continuation Information) data during the write of stream data such as video data. In this case, "Update CI" is issued before the CMD24/25 to write part of CI data, for example, 512-byte data.

The next "Update CI" is written in the next 512-byte area at a high possibility. Hence, when allocating the overwrite area for CI data, a relatively large area is preferably allocated.

If the 512-byte area from the address represented by the CMD24/25 is not assigned as the overwrite area, at least an area including the 512-byte area from the address represented by the CMD24/25 is assigned as the overwrite area.

If the 512-byte area from the address represented by the CMD24/25 is already assigned as the overwrite area, this CMD20 need not perform any processing.

(Detailed Functions of CMD20)

The functions of the CMD20 "Set Sequential-Write AU", "Set Over-Write Area", "Set Top of Data Area", and "Arrange Area" will be described next in detail.

(Setting of Sequential Write Area: Set Sequential-Write AU)

Conventionally, an AU in which data has been written partway cannot be used for data recording because of the specifications. For this reason, when the memory device is powered off and then powered on again, the free area of the AU in which data was written partway last time cannot be used, and the AU utilization efficiency lowers.

In this embodiment, an AU that has been used partway can be assigned as a sequential write area at the time of initialization.

When a designation method of making an AU used partway usable is provided, the AU utilization efficiency can be improved.

Since area management of memory card is managed by the host device 20, the card needs not hold assigned information when card is powered off. According to this method, after power is supplied to the card, the host device 20 can re-designate areas equivalent to those before power off.

The sequential write area is valid until one AU has completely been written.

Conventionally, when a random write is issued, sequential write ends, and additional write cannot be done for the AU.

In this embodiment, the assigned AU as the sequential write area can continue sequential write even the random writes to another area are inserted. For this reason, additional write can be performed in the free area of the sequential write area, and the AU utilization efficiency can be improved.

Figure 5:
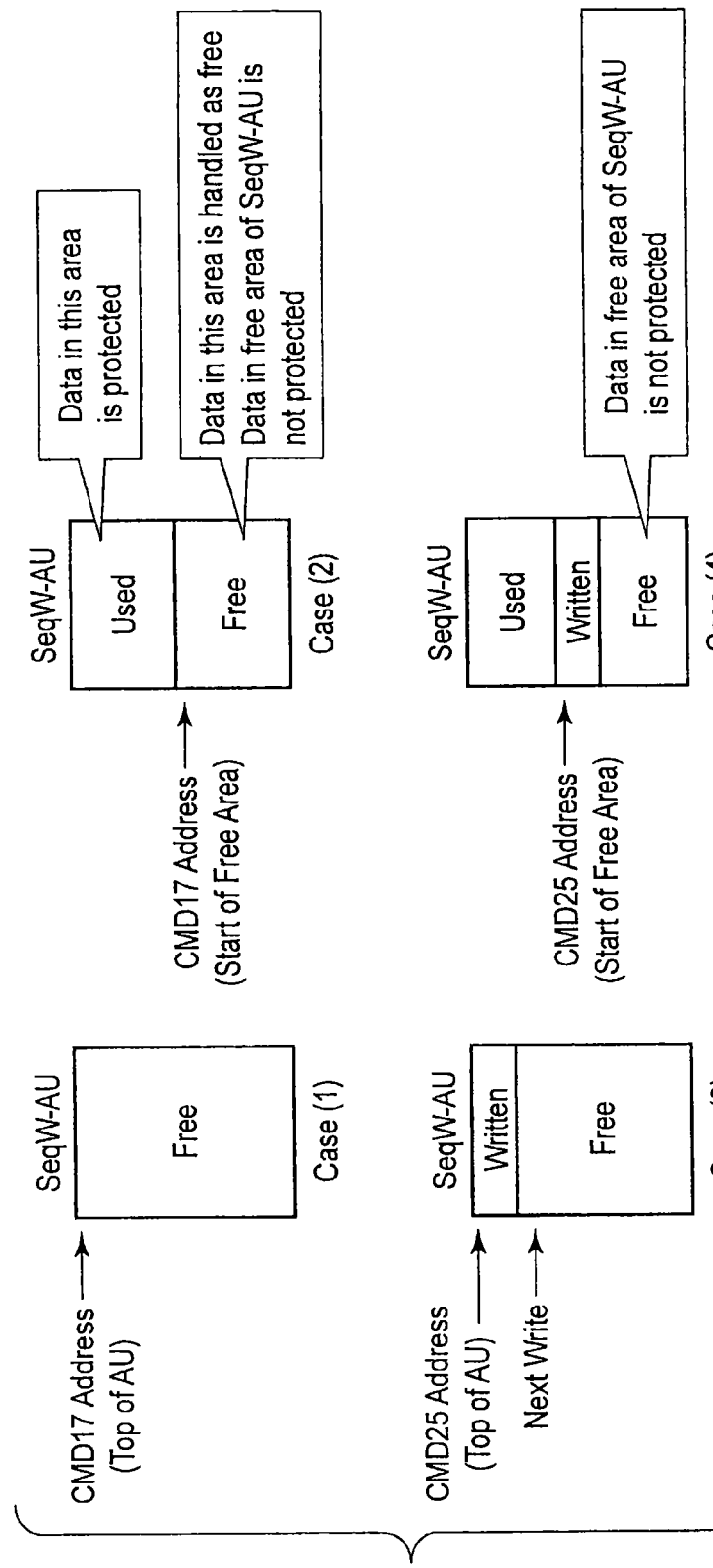
FIG. 5 is a view showing an example of the setting of a sequential write area using a command.

Setting of the sequential write area SeqW-AU will be described below in detail with reference to FIG. 5.

A command format to allocate the sequential write area SeqW-AU is as follows.

CMD20 "Set Sequential-Write AU"+CMDxx

One sequential write area SeqW-AU is designated by this command format.

Combinations of the CMD20 "Set Sequential-Write AU" and CMDxx are as follows.

CMDxx is one of two different commands, for example, a read command (CMD17) and a multi-block write command (CMD25), and the address of CMDxx indicates the start or a midpoint of an AU. As a result, four designation methods are available.

(Case 1)

When reading out a 512-byte area from the start address of an AU by the CMD17, the AU is assigned as the sequential write area. Data is written from the start of the sequential write area. Read data should be discarded due to it is meaningless.

(Case 2)

When reading out a 512-byte area from a middle address of an AU by the CMD17, the AU is assigned as the sequential write area. Data is written from the designated address. Data recorded in the area before the designated address is preserved. Read data should be discarded due to it is meaningless.

(Case 3)

When writing data from the start address of an AU by the CMD25, the AU is assigned as the sequential write area. Data is written from the start of the AU, and subsequent data is written from the address immediately after the written data.

(Case 4)

When writing data from a middle address of an AU by the CMD25, the AU is assigned as the sequential write area. Data is written from the designated middle address of the AU, and subsequent data is written from the address immediately after the written data. Data recorded in the area before the designated address is preserved.

(Period of Validity of Sequential Write Area)

The validity of the sequential write area is canceled when a new area is designated by the next CMD20 "Set Sequential-Write AU"+CMDxx.

When data has been written up to the end of the allocated sequential write area, the assignment is canceled.

When the memory device 11 is powered off, assignment of the sequential write area can be either held or canceled. Assignment is canceled even upon judging that write in the sequential write area is not sequential (overwrite has occurred). Assignment is also canceled if host assigns another area sequential write area.

(Setting of Overwrite Area: Set Over-Write Area)

As described above, the CMD20 "Set Over-Write Area" is a command to set an overwrite area. Random write data may be temporarily saved in the cache. However, since the whole user area can be subjected to random write, occurrence of cache flash may make the processing time very long. For this reason, the memory device 11 indicates long busy, and a phenomenon called "a petit freeze" may occur. In particular, the larger the block size (the physical data length serving as the base in determining the AU size) of the flash memory is, the longer the busy time tends to be because of the wide area to manage data. This poses an especially serious problem in a flash memory having a large block.

In this embodiment, the area of overwrite is designated. This makes it possible to reduce the influence of cache flash and, even in the worst case, estimate the processing time short, and prevent the card from indicating long busy.

For this reason, in this embodiment, a plurality of overwrite areas can be assigned. In addition, the busy time is predetermined, and time required for assignment is ensured.

The overwrite area is designated using the CMD20+read/write command and an address.

To designate the size of the overwrite area, for example, the following two methods are usable.

(1) A method of designating the size by CMD20

(2) A method of designating the size by a data area that has undergone read/write The method (1) (described as the argument OWAS of the CMD20) is effective when designating large areas together as an overwrite area. When a directory entry is created for the first time, data "0" needs to be written in the allocated area for initialization.

Hence, in this case, the method (2) is effective. Note that when writing data in an undesignated area, the write command may indicate a long busy. For example, the maximum busy time is set to 500 ms for the undesignated area with respect to the maximum busy time of 250 ms for the overwrite area. This means that the cache control method for the overwrite area and that for the undesignated area are different. Hence, when the address of a command to access an AU indicates access to an overwrite area, the memory device changes memory access control, for example, cache control to control different from that for areas other than the overwrite area. That is, the host device therefore designates the sequential write area and the overwrite area and performs write in the area. This allows the memory device to do efficient processing and improve total performance.

An overwrite area designation method will be described below in detail with reference to FIG. 6.

A command format to allocate the overwrite area is as follows.

CMD20 "Set Over-Write Area"+CMDxx

One overwrite area is designated by this format. For example, the card can assign eight overwrite areas at maximum. When eight or more overwrite areas are designated, the latest eight areas are valid as overwrite areas.

Combinations of CMD20 and CMDxx are as follows.

CMDxx is, for example, a multi-block read command CMD18 or a multi-block write command CMD25, and there are two different designation methods (the command may be a single write command CMD24 or a single read command CMD17).

To designate the size of the area, a method of designating the size by the argument of the CMD20 to be described later or a method of designating the size by the area accessed by CMDxx is usable.

(Case 1)

Figure 6:
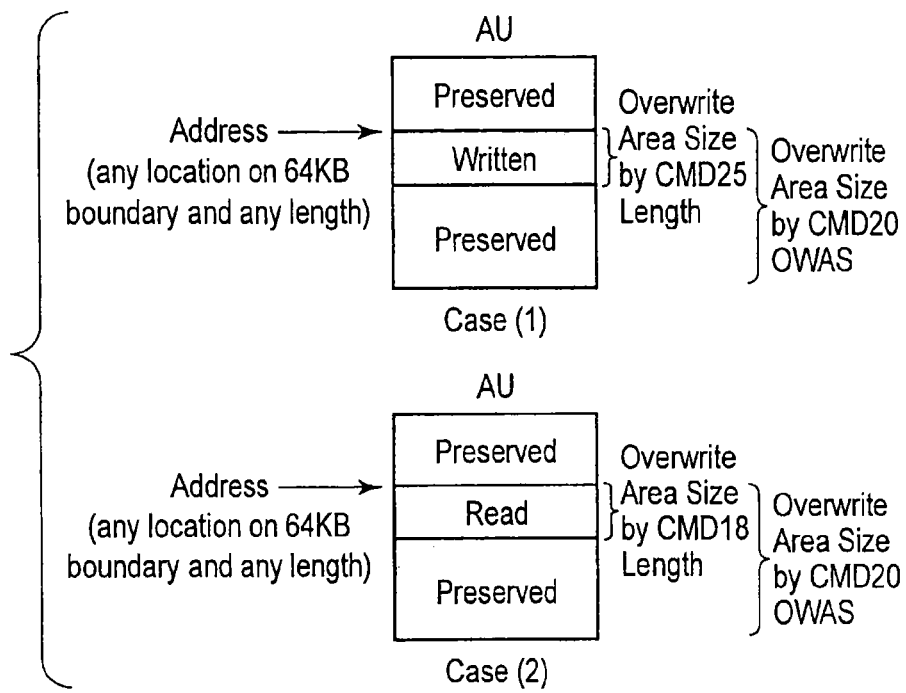
FIG. 6 is a view showing an example of control of an overwrite area using a command.

As shown in FIG. 6, when writing data from a middle address of an AU by the CMD25, part of the AU is assigned as the overwrite area, and data is written from the designated address. The overwrite area is designated by a set value represented by the argument OWAS of the CMD20 or a data length written by the CMD25. In the designated overwrite area, data in an area other than the written area is preserved.

(Case 2)

As shown in FIG. 6, when reading out 512-byte data from a middle address of an AU by the CMD18, part of the AU is assigned as the overwrite area, and data is read out from the designated address. The overwrite area is designated by a set value represented by the argument OWAS of the CMD20 or a data length read by the CMD18. Data in the designated overwrite area is preserved.

As described above, when an overwrite area is added by the CMD20 "Set Over-Write Area"+CMDxx, if the upper limit is set for the assignment count, the overwrite areas assigned latest are maintained as the overwrite areas and older one may be removed from assignment so that total assignment count is restricted by the upper limit.

When the memory device 11 is powered off, assignment of the overwrite area can be either held or canceled.

(Improvement of Setup Sequence: Set Top of Data Area)

As described above, the CMD20 "Set Top of Data Area" is a command to notify the card of the data area of the file system.

The host device 20 notifies the card of the start position of the data area representing the format of the file system. The card can thus specify the bitmap area and FAT area of exFAT (extended FAT).

In exFAT complying with the SD standard file system, the host device 20 can read out a bitmap to the RAM 24 using a read command following the CMD20 "Set Top of Data Area" and form cache of the bitmap in RAM 24.

Conventionally, a recording area is defined by the write command. Hence, preparation of the recording area cannot be done without starting recording.

In this embodiment, the recording area is designated by the address of the read command, thereby enabling preparation.

As described above, one area can be assigned as the sequential write area, and a plurality of areas can be assigned as the overwrite areas.

The host device 20 issues a command to permit the memory device 11 to prepare an area. The memory device 11 indicates busy during the preparation according to the command, thereby notifying the host device 20 that preparation is progressing.

A method of designating the start position of a data area will be described below in detail with reference to FIG. 7.

Figure 7:
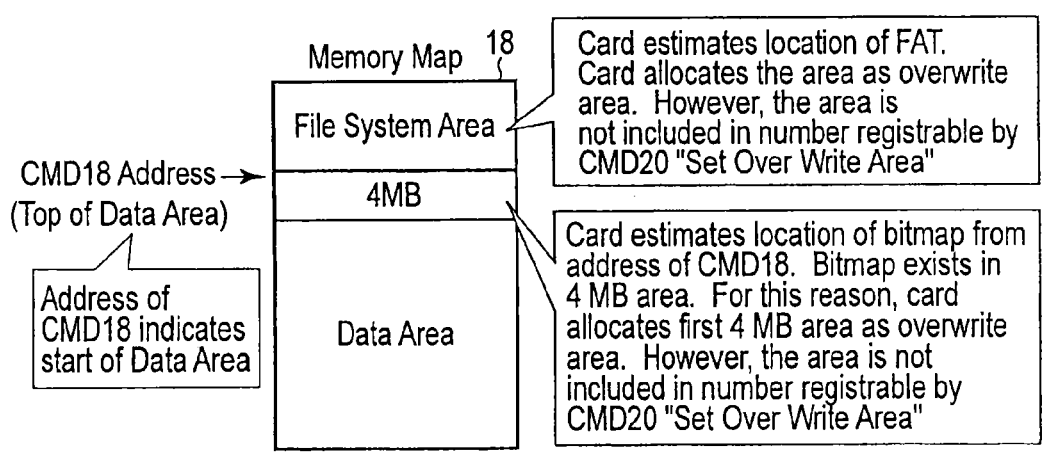
FIG. 7 is a view showing an example of control to set the start of a data area using a command.

FIG. 7 shows the memory map of the NAND flash memory 18. In exFAT complying with the SD standard file system, the user area 18a of the NAND flash memory 18 includes a file system area including a FAT before the start position of the data area, and includes a bitmap area within the first 4-MB area of the data area.

The host device 20 searches for the start address of the data area from the file system format of the memory device 11, and designates the start address of the data area by the CMD20 "Set Top of Data Area"+CMD18.

The memory device 11 can predict the position of directory information recorded in the file system area and the position of bitmap information within the first 4-MB area of the data area from the address designated by the CMD18.

Note that as for the directory area and the bitmap area, the host device 20 is not necessary to set these areas as an overwrite area but can be set these areas as an overwrite area in accordance with a simpler procedure of Set Top of Data Area. These areas are not included in the count of Overwrite Area assignment.

(Area Management: Area Management Method)

Areas to be used are distinguished by the type of data and the data length. That is, the data length of a file can be predicted by the extension of the file name or file attribute. For example, a video file can be handled as long data, and a text file can be handled as short data assumed to be rewritten. The extension of the file name or file attribute can be used as a means for predicting the data length or whether to overwrite even when the data length is indefinite.

Data associated with the file system, for example, a FAT, bitmap, or directory entry can be handled as short data and is recorded in the overwrite area.

Rewritable short data is recorded in the overwrite area, and rewritable long data is recorded in the sequential write area.

On the other hand, long data or short data assumed not to be rewritten is recorded in the sequential write area.

For example, data equal to or larger than RU=512 Kbytes is handled as long data.

The minimum unit of the sequential write area is set to 64 Kbytes (determined by the page size), and data smaller than 64 Kbytes is handled as short data.

The sequential write of short data is not limited to the RU basis (data size is multiple of RU Size and address is on RU boundary).

When data is written in the RU basis, the performance is equal or higher than Pw. Although data can also be written in a unit smaller than the RU, the performance becomes lower than Pw. "Pw becomes lower" means that the busy time indicated by the memory device becomes longer. For write in the sequential write area, the memory device confirms whether the address is sequential and whether the write data exists on the RU boundary, and controls the busy time depending on whether the conditions to yield the performance Pw are met. If the area is not the sequential write area, there is no restriction on the performance Pw, and therefore, another busy control is performed. That is, the memory device judges, for a command to access an AU, whether the address indicates access to the sequential write area, and changes memory access control, for example, busy time.

An area management method will be described below in detail with reference to FIG. 8.

As described above, the CMD20 "Arrange Area" is solely used, unlike the other CMD20. The CMD20 "Arrange Area" is a command to permit the memory device 11 to prepare an area within a specific time, and indicates completion of preparation by canceling busy of the CMD20.

In, for example, a setup sequence, the CMD20 "Arrange Area" is issued at the end of area designation.

As shown in FIG. 8, after setup is completed, the overwrite area can be designated any time by issuing the CMD20 "Set Over-Write Area"+CMD25 or CMD18 (step S11). After that, the CMD20 "Arrange Area" is issued to prepare an area (step S12). To arrange data cached by random writes to an overwrite area, the card needs a processing time. The processing time can be ensured by the CMD20 "Arrange Area", and the design becomes easy. In this case, the allowed busy time is suppressed to 250 ms because, for example, data recording may be progressing in a host device.

Note that as described above, when the CMD20 and the write command are combined, not only writing write data but also assigning the area including the data as the sequential write area or the overwrite area is performed. In addition, the maximum value of the busy time is set for each function of the CMD20 or each situation of command issuance so that the host device can estimate write performance budget. When the overwrite area or the sequential write area is designated using the CMD20, and write is performed a plurality of times, the card can control to make the average busy time of each write shorter than that in writing a plurality of times in an area other than the designated area. That is, the average busy time of write using the CMD20 can be controlled to be shorter than the average busy time of write that uses no CMD20.

(Setup Sequence)

Figure 10:
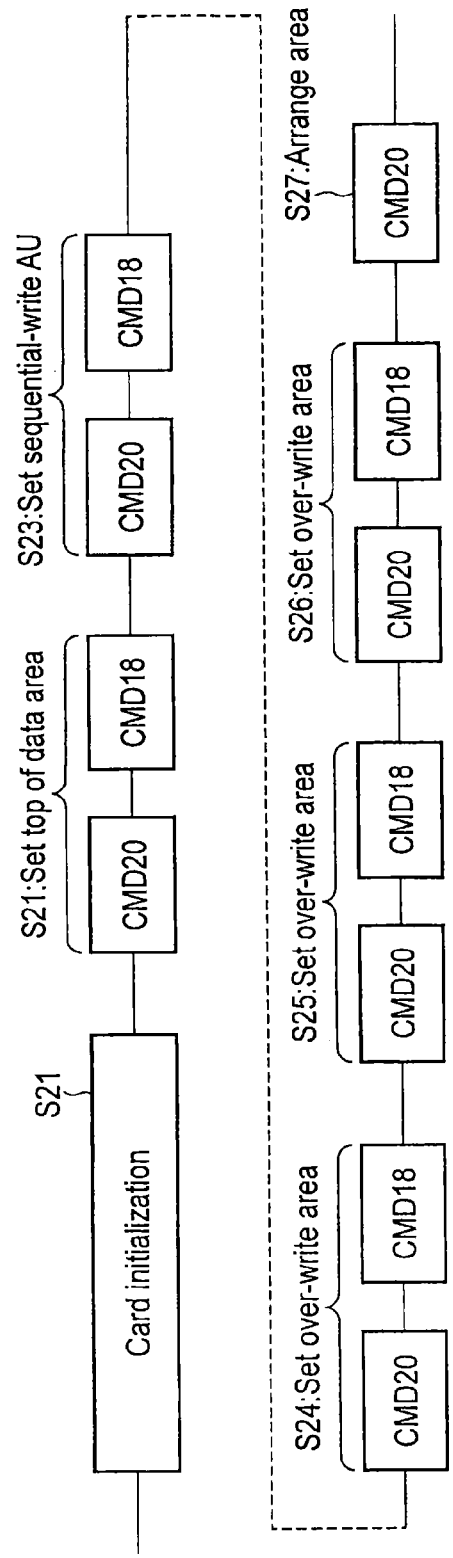
FIG. 10 is a view showing an example in which the setup sequence shown in FIG. 9B is expressed as a command sequence.

FIGS. 9A and 9B show an example of a setup sequence using the CMD20. FIG. 10 shows an example in which the setup sequence shown in FIG. 9B is expressed as a command sequence. In this example, one sequential write area and three overwrite areas are designated.

More specifically, first, the memory device (card) is initialized (step S21). After that, the start address of a data area is designated by the CMD20 "Set Top of Data Area"+CMD18, and the card assigns the DIR area and the bitmap area as the overwrite area (step S22). Next, the sequential write area is designated by the CMD20 "Set Sequential-Write Area"+CMD17 (step S23). Next, the overwrite areas are designated by the CMD20 "Set Over-Write Area"+CMD18, the CMD20 "Set Over-Write Area"+CMD25, and the CMD20 "Set Over-Write Area"+CMD18 (steps S24, S25, and S26). Finally, the CMD20 "Arrange Area" is issued, and the area in the memory device 11 is prepared during busy indication of the CMD20 "Arrange Area" (step S27).

With the above-described operation, one sequential write area and three overwrite areas are assigned.

Note that the combinations of the CMD20 and the write command or read command are not limited to those shown in FIGS. 9B and 10. By combining the CMD20 and the write command or read command, a necessary area can be set from the start or a middle point of an AU, as shown in FIG. 9A.

(Example of File Creation)

Figure 11:
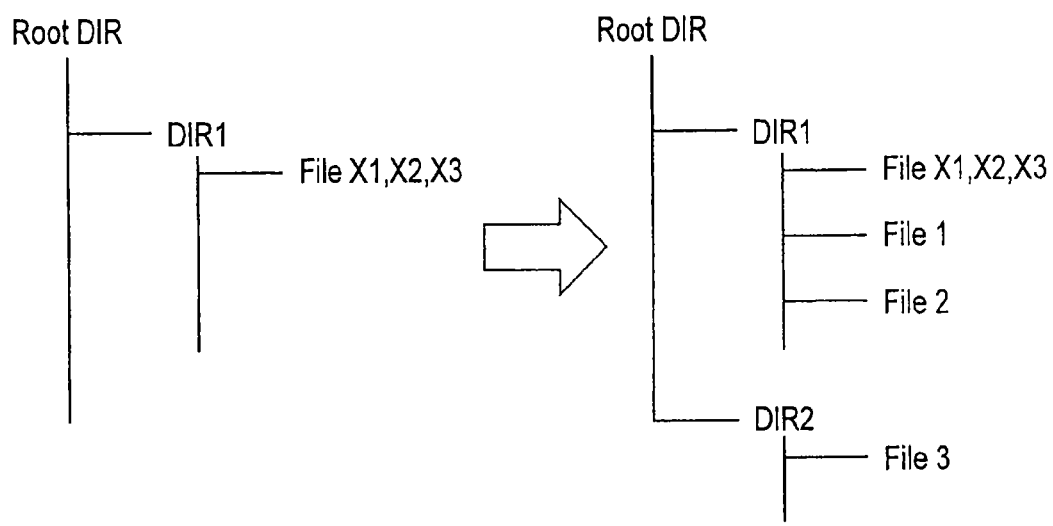
FIG. 11 is a view showing an example in which a card is initialized, subdirectories are created under a root directory, and files are created.

FIG. 11 assumes a state in which the subdirectory DIR1 exists under the root directory, and files X1, X2, and X3 are already created in the subdirectory DIR1. A case will be described in which the card is initialized in this state, the subdirectory DIR2 is newly created under the root directory, File 1 and File 2 are created in DIR1, and File 3 is created in DIR2.

Figure 12:
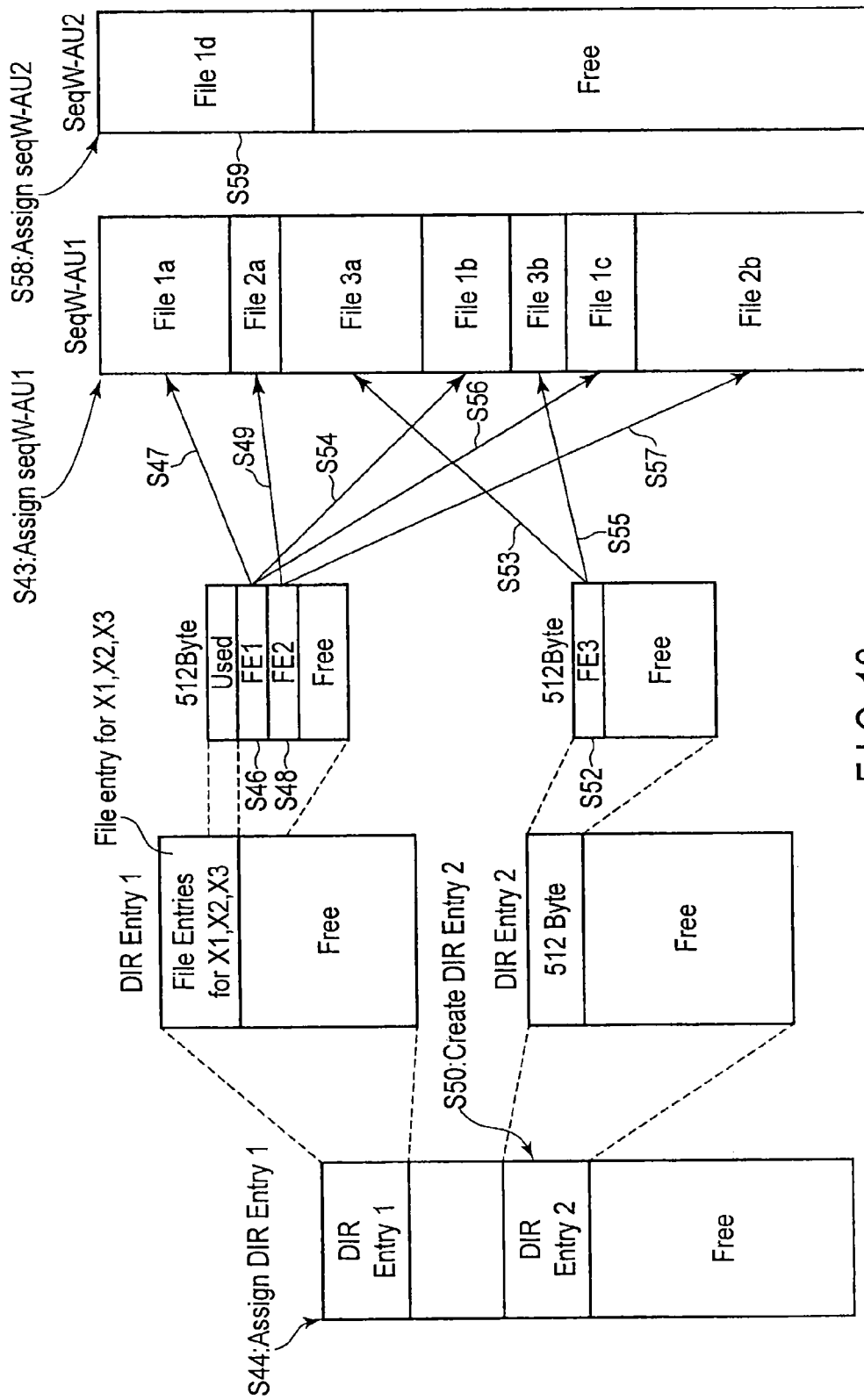
FIG. 12 is a view specifically showing the operation of FIG. 11.
Figure 13:
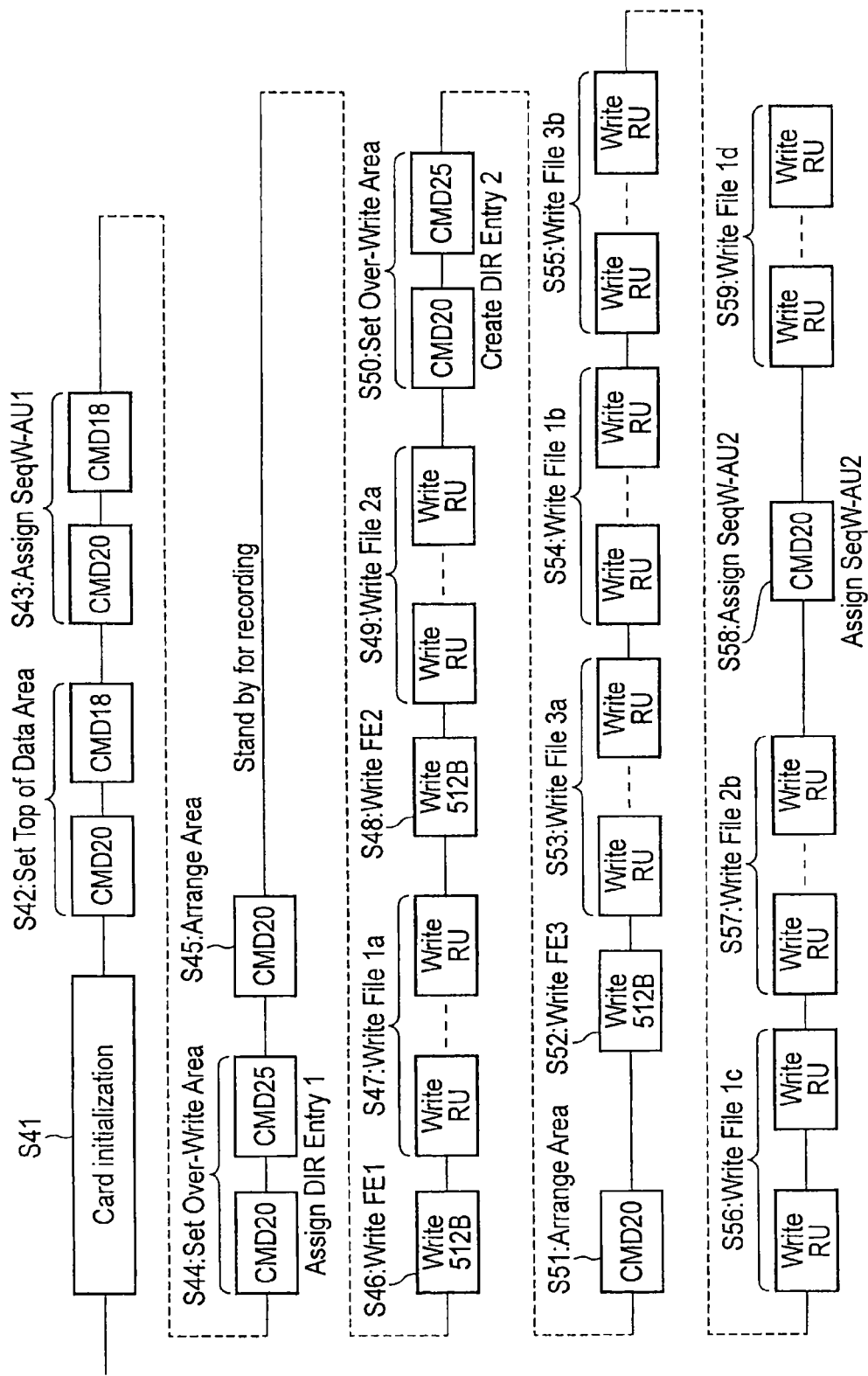
FIG. 13 is a view showing an example in which the operation of FIGS. 11 and 12 is expressed as a command sequence.

FIG. 12 is a view specifically showing an example of file creation according to this embodiment shown in FIG. 11. FIG. 13 expresses the file creation shown in FIG. 12 as a command sequence. The same reference numerals denote the same parts throughout FIGS. 12 and 13. Note that the FAT, bitmap, and root directory are not illustrated in FIG. 12.

FIGS. 12 and 13 show an example in which two sequential write areas SeqW-AU1 and SeqW-AU2 and DIR Entry 1 and DIR Entry 2 serving as two overwrite areas are designated, and data are written in these areas.

First, the initialization sequence is executed to initialize the memory device 11 (step S41).

Next, the host device 20 analyzes the format of the file system, issues the CMD20 "Set Top of Data Area"+CMD18, and designates the start address of the data area designated by the format (step S42). In exFAT complying with the SD standard file system, data read out by the CMD18 can include the bitmap area. The host device 20 can cache the readout bitmap in the system memory (RAM 24).

The host device 20 issues the CMD20 "Set Sequential-Write AU"+CMD18. The memory device 11 assigns the sequential write area SeqW-AU1 in the NAND flash memory 18 based on the command (step S43). Data can sequentially be written from the address position designated by the CMD18 to the end of the AU.

After that, the host device 20 analyzes the format of the file system and issues the CMD20 "Set Over-Write Area"+CMD25 (step S44). The already created DIR Entry 1 is thus assigned as an overwrite area by the CMD18.

The host device 20 then issues the CMD20 "Arrange Area" to instruct the memory device 11 to prepare an area (step S45). The memory device 11 is permitted to use, for example, 1 sec as the time for area preparation.

After that, the file entry FE1 of File 1 is created in the DIR Entry 1, and partial data File 1a of File 1 is written in the sequential write area SeqW-AU1 (steps S46 and S47). In this example, all file data are written on the RU basis while being made to match the RU boundary.

Next, the file entry FE2 of File 2 is created in the DIR Entry 1, and partial data File 2a of File 2 is written in the sequential write area SeqW-AU1 (steps S48 and S49).

Next, the host device 20 analyzes the format of the file system, and sequentially issues the CMD20 "Set Over-Write Area"+CMD25 and the CMD20 "Arrange Area" (steps S50 and S51). The DIR Entry 2 is thus newly assigned as an overwrite area by the CMD25.

After that, the file entry FE3 of File 3 is created in the DIR Entry 2 (step S52), and partial data File 3a of File 3 is written in the sequential write area SeqW-AU1 (step S53).

Next, subsequent data File 1b of File 1 is written in the sequential write area SeqW-AU1 (step S54).

Subsequent data File 3b of File 3 is written in the sequential write area SeqW-AU1 (step S55).

Subsequent data File 1c of File 1 is written in the sequential write area SeqW-AU1 (step S56).

Subsequent data File 2b of File 2 is written in the sequential write area SeqW-AU1 (step S57).

When the sequential write area SeqW-AU1 is filled to its capacity, the area SeqW-AU1 is excluded from the sequential area.

After that, the host device 20 issues the CMD20 "Set Sequential-Write AU". The memory device 11 newly assigns the sequential write area SeqW-AU2 in the NAND flash memory 18 based on the command (step S58).

Next, subsequent data File 1d of File 1 is written in the sequential write area SeqW-AU2 (step S59). The first CMD25 of step S59 represents the start address of the area SeqW-AU2, and the data File 1d is written from there. This logical address (address accessed from outside) is assigned to the sequential write area SeqW-AU2.

According to the above-described embodiment, the sequential write area and the overwrite areas can be designated using the arguments "Set Sequential-Write AU", "Set Over-Write Area", "Set Top of Data Area", and "Arrange Area" of the CMD20, and data can be written in these areas.

In addition, the AU written partway can be assigned as a sequential write area at the time of initialization. For this reason, the free area in the AU can be used, and the AU utilization efficiency can be improved.

(Another Example of File Creation)

FIG. 14 expresses an example of file creation shown in FIG. 3 as a command sequence.

Referring to FIG. 14, steps S61, S62, and S63 are the same as steps S41, S42, and S43 in FIG. 13. The memory device 11 is initialized, the start address of a data area designated by the format is designated, and the sequential write area SeqW-AU is designated.

Next, the host device 20 issues the CMD20 "Set Over-Write Area"+CMD18, the CMD20 "Set Over-Write Area"+ CMD18, and the CMD20 "Arrange Area" and designates the already created DIR Entry 1 and DIR Entry 2 as overwrite areas (steps S64, S65, and S66).

After that, the file entry FE1 of File 1 is written in the DIR Entry 1 (step S67), and the partial data File 1a of File 1 is written in the sequential write area SeqW-AU (step S68).

The file entries FE2 and FE3 are then written in the DIR Entry 1 (steps S69 and S70), and File 2 and File 3 are written in the sequential write area SeqW-AU (step S70). Since the performance Pw is unnecessary upon writing File 2 and File 3, the data are written in a size smaller than the RU.

Next, to write subsequent data at least at the performance Pw, dummy data serving as Padding is written in the area following File 3 up to the RU boundary (step S73). However, Padding is not always necessary processing. The memory device 11 may be configured to automatically perform Padding by analyzing the addresses and data lengths of the two memory write commands. The memory device 11 may automatically start sequential write processing from the write address of File 4.

The file entry FE4 is then written in the DIR Entry 2 (step S74), and File 4 is written in the sequential write area SeqW-AU (step S75).

Next, the subsequent data File 1b of File 1 is written in the sequential write area SeqW-AU (step S76). To determine the data of File 1 on the file system, FAT update is executed (step S77). In the FAT update, the first write indicates updating the FAT, the second write indicates updating the bitmap, and the third write indicates updating the file entry FE1. Referring to FIG. 14, when 512-byte data including the file entry FE1 is written, the file entry FE1 is updated.

(Performance Information of Video Grade)

Figure 15:
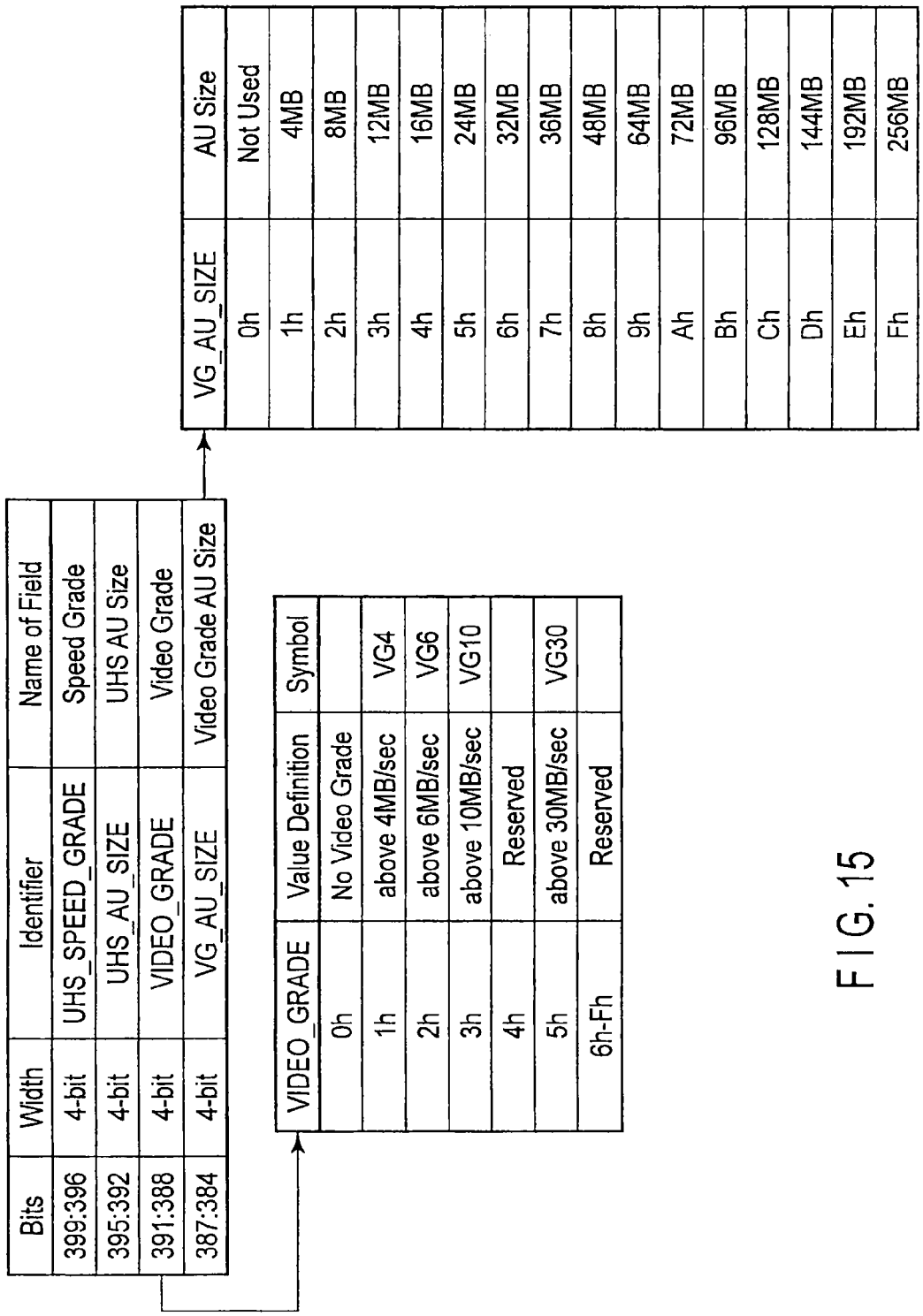
FIG. 15 is a view showing an example of performance information and AU size information of video grade.

FIG. 15 shows the newly defined performance information (VG4, VG6, VG10, VG30) of video grades and AU size information of the video grades.

The AU size of a video grade is represented by a combination of 4 MB×$2^n$×$3^m$ (n=0, 1, 2, . . . , 6; m=0, 1, 2). To allow the host device to easily manage the areas, 4 MB is used as the basic unit, and the AU size is designated by a multiple thereof. The NAND flash memory 18 stores 2-bit data in one memory cell or 3-bit data in one memory cell. Not only a memory cell having a two-dimensional structure but also a memory cell having a three-dimensional structure exists (exponentiation n, m). For this reason, necessary AU sizes can be covered by the above-described expression.

(If Holding Power Supply, State is Held as Well)

In this embodiment, information of a set sequential write area or overwrite area is held in the power down mode or hibernate mode.

For this reason, when the device has returned from the power down mode or hibernate mode, area information designated immediately before the power down mode or hibernate mode has been held, and the area can be used again.

(Conversion of Existing Speed Class Command)

In this embodiment, the CMD20 is extended, thereby defining new functions of "Set Sequential-Write AU", "Set Over-Write Area", "Set Top of Data Area", and "Arrange Area". Since the new functions include the conventional functions, the memory device that has received an existing speed class command can convert its function into the new function.

That is, the memory device 11 that implements the new functions of the CMD20 implements conversion programs for the existing commands "Start Recording", "Update DIR", and "Update CI", and can perform processing while maintaining the compatibility upon receiving the existing speed class commands.

For example, when the memory device 11 receives the control command "Start Recording", it is managed as the same as "Set Sequential-Write AU". And then another sequential write area is assigned by the following sequence. The memory device 11 confirms that data is written up to the end of a sequential write area for which the write of the write command is data write to be performed on the RU basis while being made to match the write boundary. If the next write command indicates write to be performed from the start of another AU on the RU basis while being made to match the write boundary, the newly written user area is assigned as the sequential write area.

Upon receiving the control command "Update DIR" indicating the position of the file system, the memory device 11 assigns an overwrite area by the address of the subsequent write command, assigns an area in a size including the area to be written by the write command as the size of the overwrite area, and if the area has already been assigned as an overwrite area, maintains the assignment.

Upon receiving the control command "Update CI" indicating the position to write a part of CI data during recording of the stream data, the memory device 11 assigns, as an overwrite area, an area in a certain size predicted to write CI data and including the size (512 bytes) of an area to be written by the write command, and if the area has already been assigned as an overwrite area, maintains the assignment.

The above-described conversion programs are implemented so that upon receiving an existing speed class command, the memory device can convert its function into the new function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

INDUSTRIAL APPLICABILITY

The embodiment of the present invention is used for, for example, a memory card.

The invention claimed is:
1. A memory card comprising:
a nonvolatile semiconductor memory having a plurality of physical storage areas that include a user area externally accessible, the user area being divided into plurality of allocation units; and
a controller controlling the nonvolatile semiconductor memory, wherein the controller receives a control command having a first argument to designate a sequential write area and a read command or a write command, assigns an allocation unit of the plurality of allocation units represented by an address of the read command or the write command as the sequential write area, and changes memory access control when an address of a memory access command to access the user area indicates no access in the sequential write area whose size is equivalent to the allocation unit,
the allocation unit of the plurality of allocation units is divided into plurality of recording units,
the memory access control includes controlling a busy time according to a data length of the write command and one or plurality of recording unit, and
when the address of the write command for the sequential write area is an address not to cause overwrite, the data length of the write command is equivalent to one or plurality of recording unit and a data location is on a recording unit boundary, the controller controls a busy time to make average write performance higher than a performance index, and if the condition is not met, the controller can indicate a busy time that does not meet the performance index.

2. The memory card according to claim 1, wherein the memory access control includes controlling to maintain data in unwritten.

3. The memory card according to claim 1, further comprising a buffer, wherein
the buffer temporarily stores a predetermined amount of data, and
the memory access control includes controlling to store the predetermined amount of data in the buffer.

4. The memory card according to claim 1, wherein the controller sets an area in the allocation unit from an address position of the read command or a position next to data written by the write command to an end of the allocation unit as an area in which next data can be written, and if data stored in an area before the address designated by the read command or the write command exists, preserves the data.

5. The memory card according to claim 1, further comprising a register, wherein
the register holds a performance index which indicates minimum average write performance to the sequential write area and a size of an allocation unit of the plurality of allocation units, wherein the performance index and the size of the allocation unit can externally be read out.

6. The memory card according to claim 1, wherein the controller receives a control command having a second argument to designate an overwrite area and the read command or the write command, assigns an allocation unit of the plurality of allocation units whose start position is represented by the address of the read command or the write command as the overwrite area, and changes the memory access control by judging concerning the memory access command to access the user area whether the address of the memory access command indicates access in the overwrite area.

7. The memory card according to claim 6, wherein a size of the overwrite area is determined by one of a third argument of the control command or a size of a data area accessed by the read command or the write command.

8. The memory card according to claim 6, wherein the controller receives a control command having a fourth argument to designate a data area of a file system and the read command whose address indicates a start address of the data area of the file system, and assigns the user area as a overwrite area based on the address of the read command.

9. The memory card according to claim 6, wherein
the control command has a fifth argument to designate the sequential write area first, and
the controller processes the control command having the fifth argument as the control command having the first argument.

\* \* \* \* \*